United States Patent
Crispino

[11] 3,721,470
[45] March 20, 1973

[54] ROTARY CUTTER APPARATUS FOR ROOFING MATERIAL

[76] Inventor: Daniel P. Crispino, 451 Fawcett Street, Baltimore, Md. 21211

[22] Filed: Feb. 2, 1971

[21] Appl. No.: 111,941

[52] U.S. Cl. ................................................299/39
[51] Int. Cl. ............................................E04d 15/00
[58] Field of Search...........................................299/39

[56] References Cited

UNITED STATES PATENTS

| | | | |
|---|---|---|---|
| 3,598,446 | 8/1971 | Hatcher | 299/39 |
| 519,466 | 5/1894 | Bittenbender | 175/383 |
| 2,749,103 | 6/1956 | Clemenzi | 299/39 |

FOREIGN PATENTS OR APPLICATIONS

| | | | |
|---|---|---|---|
| 551,996 | 3/1943 | Great Britain | 299/39 |

Primary Examiner—Ernest R. Purser
Attorney—Walter G. Finch

[57] ABSTRACT

A power driven rotary cutter apparatus is provided for cutting of lines in old roofing material in preparation for removing of the old roofing material and replacing it with new roofing material. The apparatus consists of a motor driven tractor having a drive member positioned substantially transversely to the direction of movement of the tractor. A heavy flywheel type wheel is positioned on the drive member, and spaced blade members are positioned around the periphery of the wheel for use in cutting of roofing material. A device is provided for adjusting the height of the blade members from a roofing surface that is to be cut by the blade members.

1 Claim, 3 Drawing Figures

INVENTOR
DANIEL P. CRISPINO
BY Walter G. Finch
ATTORNEY

ROTARY CUTTER APPARATUS FOR ROOFING MATERIAL

This invention relates generally to surface treatment apparatus, and more particularly it pertains to a rotary cutter apparatus for cutting of lines in old roofing material that is to be removed in preparation for applying a new roof to a building or a structure.

In the past, ripping of deck covering or roofing paper has been done with chisel bars which were manually thrusted under the surfacing to be removed, which was then prized upwardly to break the bonding. Only small areas could be so removed with each operation and a decking covering or roofing paper was usually broken into small pieces which cluttered the working area.

It is an object of this invention, therefore, to provide a rotary cutter apparatus for the cutting of line sections of old roofing material on the roof of a building and removal thereof in preparation for applying new roofing material, generally on large commercial establishment-type roofs.

Another object of this invention is to provide a rotary cutter apparatus for roofing which is used to cut through the old roofing material in a series of parallel cuts to aid in a subsequent ripping operation of removing the old roofing material.

Still another object of this invention is to provide a rotary cutter for use in removing of roofing material which is economical to manufacture, easy to install and maintain, and which is efficient and reliable in operational use. Other objects and attendant advantages of this invention will become more readily apparent and understood from the following detailed specification and accompanying drawings in which.

Figure 1:
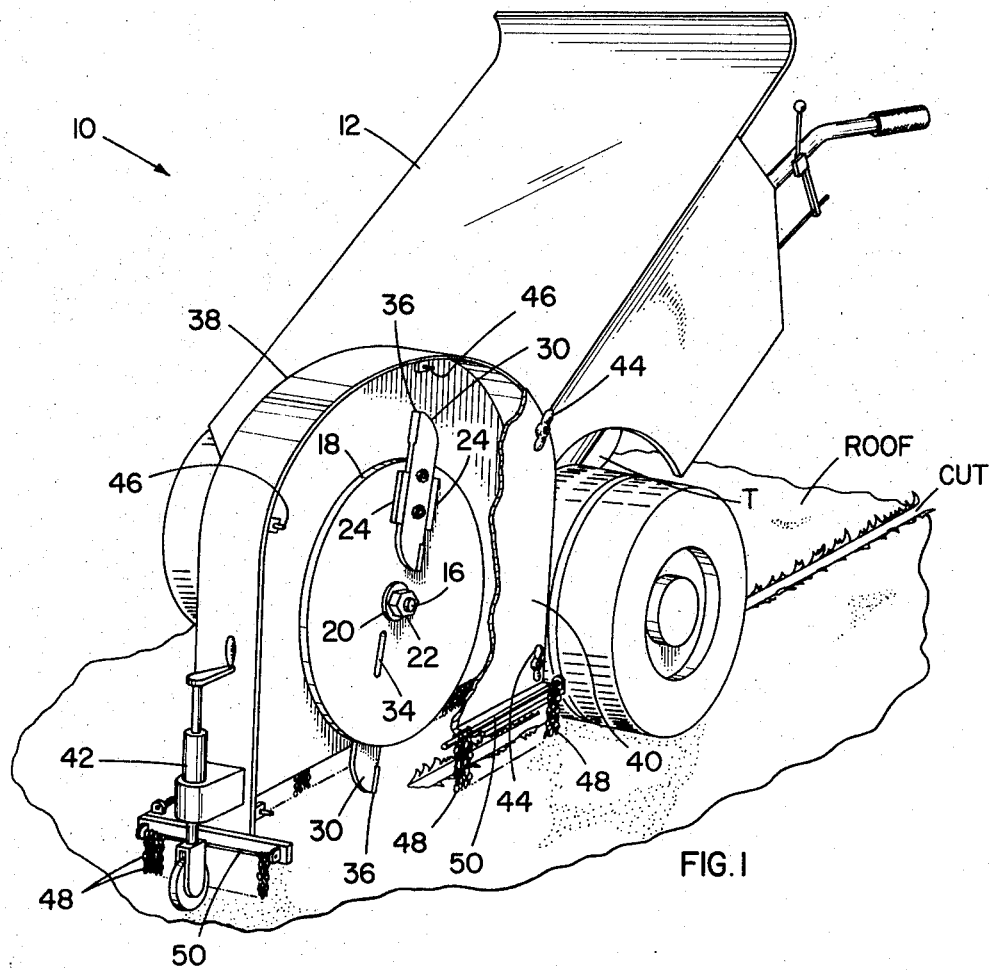
FIG. 1 is a perspective view of a rotary cutter apparatus incorporating features of this invention.
Figure 2:
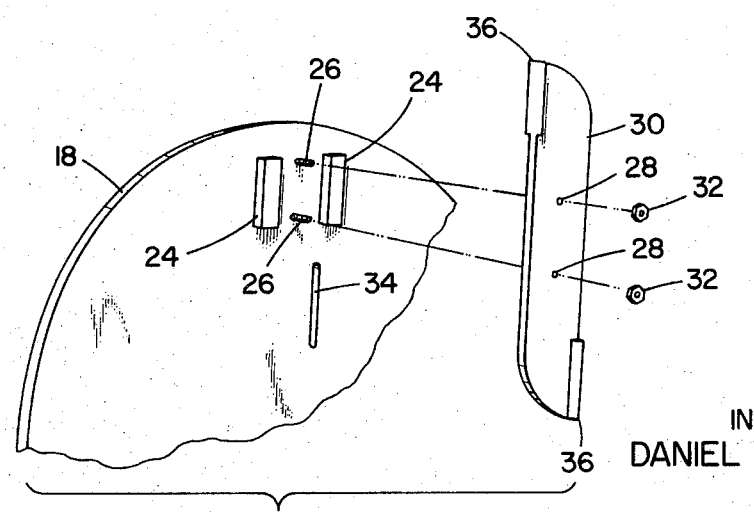
FIG. 2 is an exploded view of a cutter wheel and blade of the rotary cutter apparatus of FIG. 1.
Figure 3:
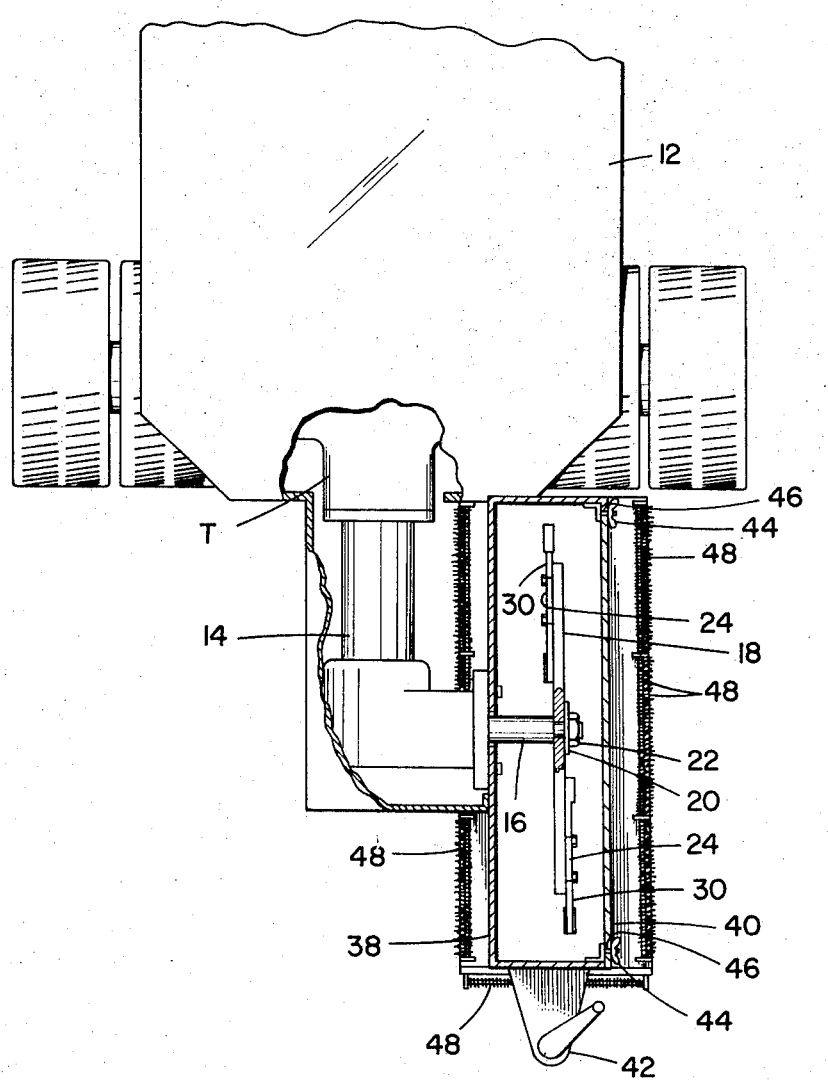
FIG. 3 is a plan view, partially cut away, of the rotary cutter of FIG. 1.

Referring now to FIGS. 1 to 3 of the drawings, there is shown a rotary cutting apparatus 10 which is designed to cut lines in old roofing material that is to be removed from a roof and replaced with new roofing material. This apparatus 10 includes a standard available hand tractor T which is covered by a protective guard 12 to protect both the apparatus and the operator of the apparatus 10.

Coupled to the motor drive of this tractor T, is a right-angle drive member 14, shown in FIG. 3, which has a shouldered output shaft 16 for attachment thereon of a heavy flywheel type blade wheel 18, shown in FIGS. 1 to 3. This blade wheel 18 is held in position on shaft 16 by a washer 20 and a nut 22 on the shaft 16.

Two reversible blades 30, positioned 180° apart, are mounted on opposite sides of the wheel 18, on the outer edge periphery thereof. Two fixed sets of locating lugs 24 are used to locate these blades 30. Threaded studs 26 mounted to the wheel 18 are fixed between the locating lugs 24 for mounting the reversible blades 30. These reversible blades 30 have holes 28 provided therein, and the blades 30 are mounted on the respective studs 26 by means of nuts 32.

Slots 34 are cut into the wheel 18 to facilitate flush mounting of the blades 30 to the wheel 18 due to a wider cutting edge 36 on the blade 18.

A housing 38 and a cover 40 are attached about the drive member 14, and the housing is open at the bottom. The cover 40 is quickly detached by removal of the wing nuts 44 which screw on threaded studs 46 and which are fixed to the housing 38.

An adjustable wheel 42 is fixed to the leading front face of housing 38 for regulating the depth of the cut of the roofing material by the blades 36.

Along the bottom edge of cover 14 and along the bottom edges of housing 38 there is mounted a chain-type guard which consists of short portions of a chain 48 hung from bars 50.

In operational use, the rotary cutter apparatus 10 is used to make cuts in old roofing material that is to be removed from a roof by a ripping machine that later rips up the sections of the roof that are to be cleared.

The motor of the tractor T is turned on and upon rotation of the wheel 18, the blades 36 upon rotation of the wheel 18 will cut into the roofing material. Depending upon the direction of movement of the tractor T which is controlled by the operator, various cuts can be made into the roofing material and in the direction desired in order to facilitate the subsequent removal of the roofing material by a ripping machine. Normally the cuts of the roofing material are arranged parallel to each other to facilitate the subsequent removal of the roofing material by a roof ripping machine.

The ripping machine is used much in the same manner as a snow plow with a tractor trusting points of teeth between the roof and the roofing paper to break the bond therebetween at multiple spaced places and then elevating each section of roofing paper that is loosened.

Obviously many modifications and variations of the present invention are possible in light of the above teachings. It is, therefore, to be understood that within the scope of the appended claims the invention may be practiced otherwise than as specifically described.

What is claimed is:

1. A power driven rotary cutter apparatus, comprising, motor driven tractor means having a drive member positioned substantially transversely to the direction of movement of said tractor means, a heavy flywheel type blade means positioned on said drive member, spaced blade members positioned around periphery and on the opposite sides of said blade wheel means, means for adjusting the height of said blade members from a surface that is to be cut by said blade members, a housing open at its bottom for said blade means, means for shielding the open bottom of said housing, with said blade members being reversible.

* * * * *